United States Patent [19]

Delabouglise et al.

[11] Patent Number: 5,149,826
[45] Date of Patent: Sep. 22, 1992

[54] POLY[(3-PYRROLYL)ACETIC ACID]

[75] Inventors: Didier Delabouglise; Francis Garnier, both of Thiais, France

[73] Assignee: Nippon Oil Co., Ltd., Tokyo, Japan

[21] Appl. No.: 637,631

[22] Filed: Jan. 4, 1991

[30] Foreign Application Priority Data

Jan. 8, 1990 [JP] Japan .................................. 2-409

[51] Int. Cl.$^5$ .................. C07D 207/30; C08F 26/06
[52] U.S. Cl. .................................... 548/518; 526/258
[58] Field of Search ........................ 548/518; 526/258

[56] References Cited

U.S. PATENT DOCUMENTS 5,059,694 10/1991 Delabouglise et al. ............ 548/518

*Primary Examiner*—Mary C. Lee
*Assistant Examiner*—Joseph K. McKane
*Attorney, Agent, or Firm*—Oblon, Spivak, McClelland, Maier & Neustadt

[57] ABSTRACT

A poly[(3-pyrrolyl)acetic acid] is here disclosed which is represented by the formula (I)

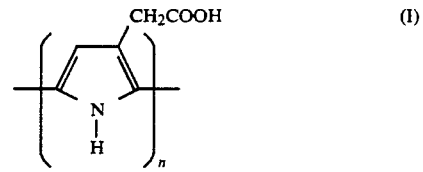

wherein n is an integer of 2 or more.

This polymer can be prepared by subjecting (3-pyrrolyl)acetic acid to electrolytic oxidation polymerization in the presence or absence of a salt. The polymer can be used as a pH sensor in which electrical properties change in accordance with a pH. Furthermore, it can also be used as electrodes for a secondary battery in which a cation transport electrolyte is used.

2 Claims, 1 Drawing Sheet

POLY[(3-PYRROLYL)ACETIC ACID]

BACKGROUND OF THE INVENTION (i) Field of the Invention

The present invention relates to a poly[(3-pyrrolyl)acetic acid] and a method for preparing it.

(ii) Description of the Related Art

It is already well known that a polypyrrole becomes electrically conducting upon oxidation. U.S. Pat. No. 3,574,072 also discloses that the polymerization of such a polymer can be electrochemically put into practice. Furthermore, the oxidation potential of the abovementioned polymer is extremely low ($E_{ox} = -0.1V/SCE$), and the polymer in a doped condition also exhibits electroconductivity and is excellent in environmental stability. For these reasons, it is expected that this polymer can be applied to many fields, and therefore much attention is paid to the polymer.

With regard to the modification of physical properties of this polymer, it has been attempted to change dopants and to alter substituents of pyrrole. In connection with the substituents, the substitution on the nitrogen atom has been mainly studied. However, the N-substitution on the polypyrrole inconveniently results in a steep decrease in conductivity ($<10^{-3} S\cdot cm^{-1}$) and a noticeable increase in the oxidation potential of the resulting polymer ($E_{ox} > 0.6V/SCE$).

A recent work has reported the functionalization of the polymer by linking ferrocenyl groups to the 3-carbon atom of a pyrrole monomer through an alkyl spacer. It has been also reported that the 3- or 3,4-substitution of the pyrrole monomer has less influence on conductivity of the resultant polymer than the N-substitution.

With regard to a ferrocenylpyrrole monomer, the steric hindrance of a substituent does not allow the formation of a continuous homogeneous film. However, it is known that the above-mentioned problem has been overcome by copolymerizing substituted pyrrole with unsubstituted pyrrole so as to dilute the ferrocenyl group in the polymer.

On the other hand, it has been elucidated by various means that the electrochemical redox process of the polypyrrole include transports of the two electrolyte species, i.e., an anion and a cation in opposite directions inside the polymer These two ionic transports can be separated into two different redox systems by using a large-sized electrolyte anion, and the present inventors are under researches on the separation of an ionic process regarding a hydrophobic pyrrole.

In the wake of the above-mentioned researches, the present inventors have investigated the polymer of a pyrrole in which the 3-carbon atom is substituted with a carboxymethyl group, and as a result, they have found that the polymer can be obtained by conventional known electrolytic oxidation polymerization.

SUMMARY OF THE INVENTION

An object of the present invention is to provide an electroconductive polymer having a pH sensitivity whose electrical properties change in response to a pH.

Another object of the present invention is to provide an electroconductive polymer which is useful as an electrode of a secondary battery using a cation transporting electrolyte.

Still another object of the present invention is to provide a method for preparing a poly[(3-pyrrolyl)acetic acid] which can achieve the above-mentioned objects.

That is, the poly[(3-pyrrolyl)acetic acid] of the present invention is a polymer represented by the formula

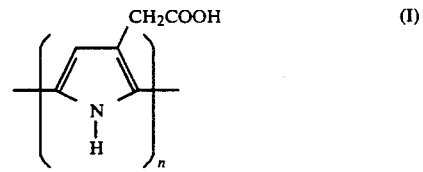

wherein n is an integer of 2 or more.

Furthermore, the method for preparing the poly[(3pyrrolyl)acetic acid] of the present invention comprises the step of subjecting (3-pyrrolyl)acetic acid to electrolytic oxidation polymerization in the presence or absence of a salt in order to obtain the poly[(3-pyrrolyl)acetic acid] represented by the formula (I).

Figure 1:
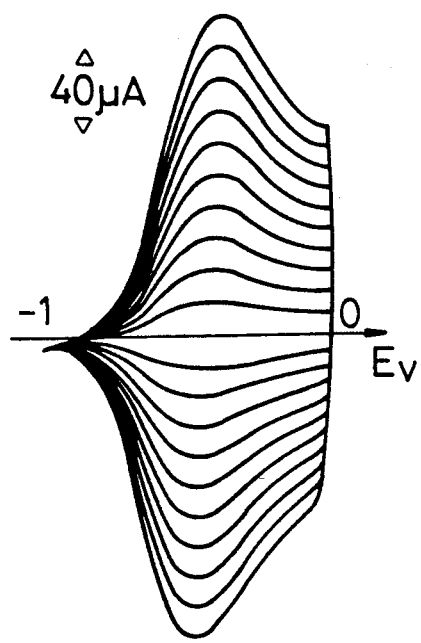
FIG. 1 is a cyclic voltammogram of a poly[(3-pyrrolyl)acetic acid] of the present invention.

DETAILED DESCRIPTION OF THE INVENTION (3-pyrrolyl)acetic acid which is the raw material monomer of a poly[(3-pyrrolyl)acetic acid] of the present invention can be prepared by, for example, subjecting the acyl group of 3-acetyl-1-tosylpyrrole to oxidative transition reaction, and successively hydrolyzing an N-protective group.

The poly[(3-pyrrolyl)acetic acid] represented by the above-mentioned formula (I) of the present invention can be prepared by subjecting (3-pyrrolyl)acetic acid obtained by the above-mentioned process or the like to electrolytic oxidation polymerization in the presence or absence of a salt. A typical example of the salt which can be used in the electrolytic oxidation polymerization is a salt of (a) one or more cations selected from the group consisting of $H^+$, $Li^+$, $Na^+$, $K^+$, $R^1_4N^+$ and $R^1_4P^+$ (wherein each $R^1$ is independently a hydrogen atom, an alkyl group, a cycloalkyl group or an aryl group) and (b) one or more anions selected from the group consisting of $BF_4^-$, $AsF_4^-$, $AsF_6^-$, $SbF_6^-$, $SbCl_6^-$, $PF_6^-$, $ClO_4^-$, $HSO_4^-$, $SO_4^{2-}$ and

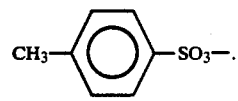

In the method using the salt, the above-mentioned salt is used as an electrolyte in the form of a solution having a concentration of from 0.001 to 1 mole/liter, and (3-pyrrolyl)acetic acid represented by the formula

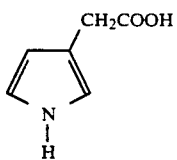

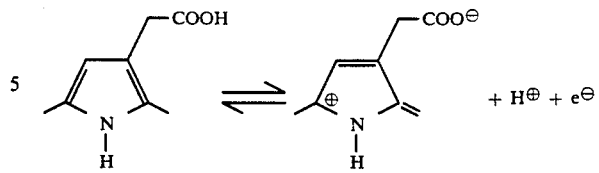

is then added to the electrolyte so that the concentration of (3-pyrrolyl)acetic acid may be from 0.001 to 1 mole/liter. Afterward, direct current is applied to the electrolyte, whereby the poly[(3-pyrrolyl)acetic acid] represented by the above-mentioned formula (I) is deposited and then grows on the surface of an anode, and it can be obtained in the form of a film. In this connection, n in the formula (I) is an integer of 2 or more, preferably 10 or more, and the upper limit of the n is about 1000.

As a solvent for the electrolyte, any one can be used, so long as it can dissolve (3-pyrrolyl)acetic acid. Examples of the solvent include organic solvents such as benzonitrile, acetonitrile, propylene carbonate, dimethylformamide, tetrahydrofuran and nitrobenzene, water and mixtures thereof.

In addition to the above-mentioned method, the poly[(3-pyrrolyl)acetic acid] of the present invention can be prepared by chemically oxidizing the raw material, i.e., (3-pyrrolyl)acetic acid by the use of an oxidizing agent having a higher oxidative potential than (3-pyrrolyl)acetic acid, for example, an $Fe^{3+}$ compound, as in case that polymers of other pyrroles are prepared.

In this chemical oxidizing process, the reaction can be carried out in a solvent system or a non-solvent system, and the polymer can be directly obtained in the state of a solvent-insoluble powder or a film-like solid. As the reaction solvent, any one can be used without particular restriction, so long as it does not react with the oxidizing agent. Preferable examples of the reaction solvent include water, lower alcohols, acetone, acetonitrile and mixtures thereof.

In the reaction of the solvent system, no particular restriction is put on concentrations of the raw material, i.e., (3-pyrrolyl)acetic acid and the oxidizing agent, and the respective concentrations thereof are in the range of from 0.001 mole/liter to the level of saturation.

In the present invention, the poly[(3-pyrrolyl)acetic acid] obtained by the above-mentioned process takes the structure represented by the formula (I), but when the salt or the oxidizing agent is used in the polymerization reaction, the polymer is doped with the used salt or the anion of the oxidizing agent.

With regard to the poly[(3-pyrrolyl)acetic acid] of the present invention, an anode peak potential (Epa) and a cathode peak potential ($E_{pc}$) change linearly in connection with a pH in an acidic pH range (pH=0-6), as shown in FIG. 1. However, in case that the pH is in excess of the above-mentioned range, this linearity of the change is lost. The observed fact is well in accord with a redox system represented by the formula which comprises the dissociation equilibrium of a carboxyl substituent.

As understood from the foregoing, the electroconductive state of the electroconductive polymer of the present invention can be obtained without requiring the doping of outside electrolyte species. That is, in the polymer of the present invention, a carboxyl pendant group compensates a positive charge appearing in the aromatic main chain during the oxidation reaction.

In a neutral solvent and a basic solvent, the carboxyl group is completely dissociated in order to form a polyanionic substance. In this case, the redox system is constituted of cation transport instead of conventional anion exchange which is observed in the cycle of the oxidative state and the neutral state of the electroconductive polymer. The polymer of the present invention contains a methylene group spacer between the carboxyl group and the pyrrole ring, and therefore it has self compensation properties and is more excellent in electroconductivity, as compared with an already known poly(3-carboxylpyrrole).

In the poly[(3-pyrrolyl)acetic acid] of the present invention, $E_{pa}$ and $E_{pc}$ change linearly with respect to a pH, and hence it can be used as a pH sensor. Furthermore, the poly[(3-pyrrolyl)acetic acid] of the present invention can be used as electrodes of a secondary battery in which a cation transport electrolyte is employed.

SYNTHESIS EXAMPLE 1

Preparation of methyl[3-(1-tosylpyrrole)] acetate:

In a 250-cm³ three-necked flask equipped with a thermometer, a condenser and a calcium chloride pipe, 5.26 g of 3-acetyl-1-tosylpyrrole (20 mmoles) were introduced together with 100 cm³ of methanol, 10 g of =10 titanium (III) nitrate trihydrate and 1 cm³ of 70% perchloric acid. The solution was then stirred at room temperature for 24 hours. The temperature of the solution rose slowly and then was stabilized while the whity precipitate of titanium (I) nitrate appeared. The suspension was filtered, dried and then allowed to stand.

Afterward, diethyl ether was added to the thus dried material, and the solution was then filtered again. The resulting organic phase was washed with water, a 10% $NaHCO_3$ queous solution and water in this order, followed by drying and evaporation. The desired product was separated from oxidized impurities by eluting on silica gel (250 g; 60–200 μm; 60/40=heptane/ethyl acetate), whereby 3.08 g of yellowish crystals were obtained (molecular weight=293; yield=52.5%).

Melting point=about room temperature

NMR (CDCl₃) ppm 7.85d, 2H; 7.4d 2H; 7.2 2H; 6.36 1H; 3.8 s 3H; 3.54 s 2H; 2.5, s 3H.

IR (cm⁻¹) 3138, 2954, 1737, 1595, 1436, 1367, 1171, 1100, 1061.

Preparation of (3-pyrrolyl)acetic acid:

In a 100-cm³ flask equipped with a condenser, the above-mentioned product (10.5 mmoles) was introduced together with 30 cm³ of methanol. Next, 30 cm³ of a 5N sodium hydroxide aqueous solution was added thereto, and reaction was then carried out under reflux for 2.5 hours.

Afterward, the solvent was evaporated, and the aqueous phase was washed with ethyl acetate, acidified to pH 3 with concentrated hydrochloric acid (10 cm$^3$), and then extracted with diethyl ether. The used solvent was evaporated from the organic phase under reduced pressure in order to obtain 0.93 g of brown crystals (molecular weight=125; yield=70%).

Melting point=90° C.

NMR (DMSOd$_6$) ppm 12.0 1H; 10.6 1H; 6.7 2H; 6.0 1H; 3.36 s 2H.

IR (cm$^{-1}$) 3383, 1696, 1416, 1399, 1340, 1279, 1212, 1071.

EXAMPLE

Preparation of poly[(3-pyrrolyl)acetic acid]:

(1) Electrochemical polymerization:

5 cm$^3$ of a solution containing 0.064 g of (3-pyrrolyl)acetic acid (0.5 mmole, 0.1M) and 2.65 g of lithium perchlorate (1M) in distilled propylene carbonate were introduced in a three-electrode electrochemical cell. The solution was then degassed by bubbling argon therein for 15 minutes. A reference electrode was used which contained a solution of 0.1M Ag/AgNO$_3$ in acetonitrile and which was fixed with a pipe containing a solution of 0.1M lithium perchlorate in acetonitrile. The electrochemical polymerization was performed on a 0.07 cm$^2$ area platinum electrode with a platinum wire as a counter electrode at a constant potential of 0.5V.

(2) Voltammetric analysis:

10 cm$^3$ of a solution of 0.2M potassium chloride in demineralised water were introduced in the same electrochemical cell as in the above-mentioned (1). The working electrode was covered with the film of a poly[(3-pyrrolyl)acetic acid] (0.1 C/cm$^2$). A saturated calomel electrode was used as a reference electrode. Next, the electrolyte was degased. A cyclic voltammogram was obtained at a scanning speed of from 10 to 100 mV/S, and it is shown in FIG. 1.

Figure 2:
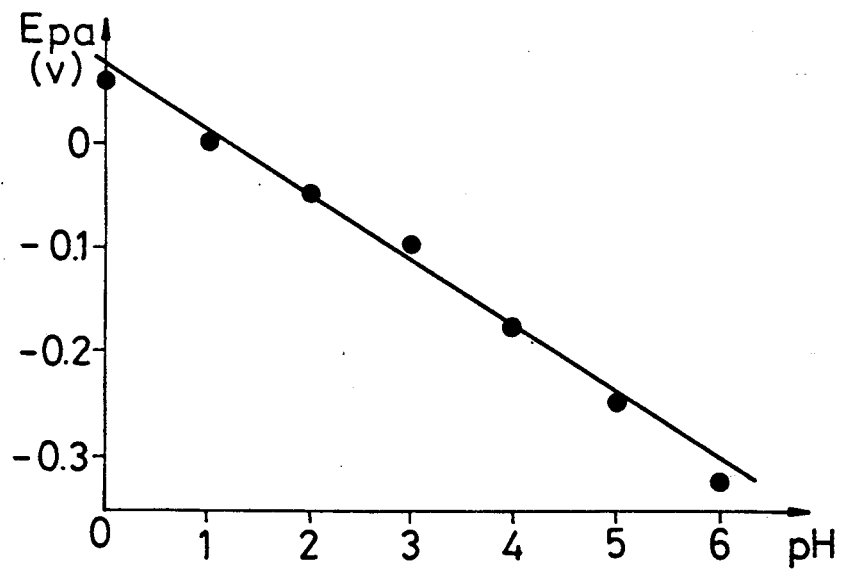
FIG. 2 is a graph showing a pH dependence of $E_{pa}$ of the poly[(3-pyrrolyl)acetic acid] of the present invention.

Using different standard pH buffer solutions gave rise to identically shaped voltammograms shifted on the potential scale by 60 mV per pH unity. This fact is shown in FIG. 2.

(3) Conductivity:

The polymer synthesis was carried out in a larger electrochemical cell (10 cm$^3$) than in the above-mentioned (1). In this electrochemical cell, a plane platinum electrode whose area was delimited to 4 cm$^2$ with parafilm, and an aluminum foil were used as a working electrode and a counter electrode, respectively. The film of a poly[(3-pyrrolyl)acetic acid] was electrodeposited (1C/cm$^2$), peeled off the electrode, washed with acetone and then dried at room temperature. The obtained film was brittle and black. The thickness of the film was 3.4 μm and its conductivity measured by a two-probe technic was 0.3S/cm.

What is claimed is:

1. A poly[(3-pyrrolyl)acetic acid] represented by the formula (I)

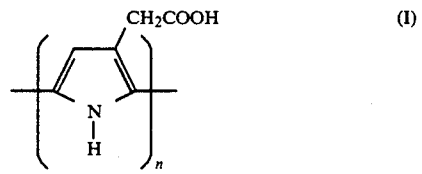

wherein n is an integer of 2 or more.

2. The poly[(3-pyrrolyl)acetic acid] according to claim 1 wherein n in the formula (I) is an integer of 10 or more.

* * * * *